(12) United States Patent
Sun et al.

(10) Patent No.: US 11,841,428 B2
(45) Date of Patent: Dec. 12, 2023

(54) STORAGE FOR ACTIVE RANGING SYSTEMS WITH WRITE AND OVERWRITE SPECIFIC INSTRUCTIONS

(71) Applicant: Analog Devices International Unlimited Company, Limerick (IE)

(72) Inventors: Tairan Sun, Shanghai (CN); Libo Meng, Shanghai (CN)

(73) Assignee: Analog Devices International Unlimited Company, Limerick (IE)

( * ) Notice: Subject to any disclaimer, the term of this patent is extended or adjusted under 35 U.S.C. 154(b) by 768 days.

(21) Appl. No.: 16/582,365

(22) Filed: Sep. 25, 2019

(65) Prior Publication Data

US 2021/0088659 A1 Mar. 25, 2021

(51) Int. Cl.
*G01S 17/10* (2020.01)
*G01S 7/486* (2020.01)
*G06F 12/02* (2006.01)

(52) U.S. Cl.
CPC ............ *G01S 17/10* (2013.01); *G01S 7/4868* (2013.01); *G06F 12/0246* (2013.01)

(58) Field of Classification Search
CPC ...... G01S 17/10; G01S 7/4868; G01S 7/4863; G01S 17/48; G06F 12/0246
See application file for complete search history.

(56) References Cited

U.S. PATENT DOCUMENTS

| | | |
|---|---|---|
| 5,631,424 A | 5/1997 | Nieters et al. |
| 5,680,341 A | 10/1997 | Wong et al. |

(Continued)

FOREIGN PATENT DOCUMENTS

| | | | | |
|---|---|---|---|---|
| CH | WO1999013356 | * | 3/1999 | ............ G01S 17/50 |
| CN | 109814117 A | | 5/2019 | |

(Continued)

OTHER PUBLICATIONS

Barral, A Fernandez, "Gamma-Ray Telescopes", in Extreme Particle Acceleration in Microquasar Jets and Pulsar Wind Nebulae with the Magic Telescopes, Springer Theses, (2018), 63 pgs.

(Continued)

*Primary Examiner* — Michael P LaPage
(74) *Attorney, Agent, or Firm* — Schwegman Lundberg & Woessner, P.A.

(57) ABSTRACT

A system and method for storing sensed values in an optical receiver corresponding to time-of-flight windows for receiving optical signals elicited by emitted optical pulses includes at least one photodetector, a storage array, and a control circuit. The at least one photodetector is configured to generate output signals indicative of received optical signals. The storage array includes a plurality of storage elements and is connected to receive and store the output signals from the at least one photodetector corresponding to at least a portion of a time-of-flight receive window. The control circuit is configured to control storage of output signal values by the storage array, and is configured to: write and overwrite the output signal values to a first subset of the plurality of storage elements, detect an event based on the written output values, and retain data on respective analog storage elements that comprise at least the first subset of the plurality of storage elements in response to detection of the event.

20 Claims, 10 Drawing Sheets

(56) References Cited

U.S. PATENT DOCUMENTS

| | | | |
|---|---|---|---|
| 5,696,577 | A | 12/1997 | Stettner et al. |
| 6,414,746 | B1 | 7/2002 | Stettner et al. |
| 8,294,809 | B2 | 10/2012 | Stettner |
| 8,587,773 | B2 | 11/2013 | Bamji et al. |
| 8,804,101 | B2 | 8/2014 | Spagnolia et al. |
| 9,069,061 | B1 | 6/2015 | Harwit |
| 9,684,066 | B2 | 6/2017 | Bartolome et al. |
| 10,203,399 | B2 | 2/2019 | Retterath et al. |
| 2002/0036765 | A1 | 3/2002 | Mccaffrey et al. |
| 2011/0024620 | A1* | 2/2011 | Hidalgo .............. H01J 49/0027 250/282 |
| 2013/0242283 | A1 | 9/2013 | Stettner et al. |
| 2015/0028213 | A1 | 1/2015 | Weinberg et al. |
| 2015/0039397 | A1* | 2/2015 | Fuchs ................ G06Q 30/0283 705/7.35 |
| 2017/0134687 | A1* | 5/2017 | Rios, III ................ G07C 5/008 |
| 2017/0343653 | A1 | 11/2017 | Weinberg |
| 2018/0164440 | A1 | 6/2018 | Fried et al. |
| 2018/0252800 | A1 | 9/2018 | Morcom |
| 2018/0292534 | A1 | 10/2018 | Field |
| 2018/0306908 | A1 | 10/2018 | Meng et al. |
| 2019/0154812 | A1 | 5/2019 | Meng et al. |
| 2019/0299860 | A1* | 10/2019 | Nix .................... B60W 50/0098 |

FOREIGN PATENT DOCUMENTS

| | | |
|---|---|---|
| CN | 112559382 | 3/2021 |
| DE | 102020124048 | 3/2021 |
| JP | 2010237067 | 10/2010 |
| JP | 2015155872 | 8/2015 |
| JP | 7076515 B2 | 5/2022 |
| KR | 101111446 | 6/2012 |

OTHER PUBLICATIONS

Coto, Ruben Lopez, "Very-high-energy gamma-ray observations of pulsar wind nebulae and cataclysmic variable stars with magic and development of trigger systems for IACTs", Doctoral Thesis, Universitat Autonoma de Barcelona, (Jul. 2, 2015), 265 pgs.

Guberman, Daniel Alberto, "Magic observations with bright Moon and their application to measuring the VHE gamma-ray spectral cut-off of the PeVatron candidate Cassiopeia A", Doctoral Thesis, Universitat Autonoma de Barcelona, (2018), 165 pgs.

"Chinese Application Serial No. 202011026388.4, Voluntary Amendment filed Jul. 16, 2021", w/ English claims, 12 pgs.

"Japanese Application Serial No. 2020-159651, Notification of Reasons for Refusal dated Sep. 6, 2021", w/ English Translation, 6 pgs.

"Japanese Application Serial No. 2020-159651, Response filed Dec. 6, 2021 to Notification of Reasons for Refusal dated Sep. 6, 2021", w/ English Claims, 7 pgs.

"Chinese Application Serial No. 202011026388.4, Office Action dated Sep. 28, 2023", w/o English Translation, 6 pgs.

* cited by examiner 400a  400b  400n

STORAGE FOR ACTIVE RANGING SYSTEMS WITH WRITE AND OVERWRITE SPECIFIC INSTRUCTIONS

TECHNICAL FIELD

This document pertains generally, but not by way of limitation, to lidar systems and particularly but not by way of limitation to storage for pulse-based active ranging systems.

BACKGROUND

Lidar systems may be used, for example, to determine a distance to an object-of-interest. Pulsed laser light can be used to illuminate the object-of-interest, and the lidar system can collect the reflected or scattered pulses, which are sensed by one or more sensor elements. The return time and wavelength of the sensed reflections can be measured by the lidar system to determine the distance and/or location of the object.

SUMMARY

It is desirable to reduce the size and cost of lidar receivers. In conventional lidar systems, storage devices may be used to store data from the one or more sensor elements during a time-of-flight (TOF) of an emitted pulse. Thus, the greater the possible distance to a target, and the greater the desired measurement precision, the greater the number of required storage devices. For example, if storing values every 2 ns, 1,000 storage elements may be needed to handle distances up to 200 m. Thus, values are stored to each of the 1,000 storage elements during the expected TOF of the emitted pulse. After the TOF window is complete, the entirety of the data stored by the 1,000 storage elements can be digitized for further processing.

The present inventors have realized, among other things, that the majority of values stored by the storage elements during the TOF window of the emitted pulse relate to ambient data. Thus, storage elements that contain ambient data can be reused/overwritten during the TOF window. When an event, such as a return pulse, is detected, the storage elements that stored data during the detection window of the trigger event can be reserved for later processing. For example, 10 storage elements that stored data around (before, during, and after) the detection event can be reserved for further processing. The storage elements outside the detection window can continue to be reused/overwritten during the remainder of the TOF window. The detection window can be set immediately upon detection of a trigger event using analog detection circuitry, for example, or can be set after the TOF window is complete using a dynamic threshold. This facilitates a reduction in the number of required storage elements for each TOF window and/or reduces the burden on the analog-to-digital conversion, reducing the overall size and cost of the lidar receiver.

In an example, a system for storing sensed values in an optical receiver corresponding to time-of-flight windows for receiving optical signals elicited by emitted optical pulses includes at least one photodetector, a storage array, and a control circuit. The at least one photodetector is configured to generate output signals indicative of received optical signals. The storage array includes a plurality of storage elements and is connected to receive and store the output signals from the at least one photodetector corresponding to at least a portion of a time-of-flight receive window. The control circuit is configured to control storage of output signal values by the storage array, and is configured to: write and overwrite the output signal values to a first subset of the plurality of storage elements, detect an event based on the written output values, and retain data on respective analog storage elements that comprise at least the first subset of the plurality of storage elements in response to detection of the event.

In another example, a method for storing sensed values in an optical receiver corresponding to time-of-flight windows for receiving optical signals elicited by emitted optical pulses includes generating, by at least one photodetector, output signals indicative of received optical signals; writing and overwriting the output signals to a first subset of a plurality of storage elements of a storage array during at least a portion of a time-of-flight receive window; detecting an event based on the written output signals; and retaining data on respective analog storage elements that comprise at least the first subset of the plurality of storage elements in response to detection of the event.

Each of these non-limiting examples or aspects can stand on its own, or can be combined in various permutations or combinations with one or more other examples or aspects. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

An active ranging receiver storage system, such as for a lidar receiver, is disclosed herein that employs an analog storage array that includes storage devices that are rewritable during a time-of-flight (TOF) window of an emitted pulse. The storage system includes a control circuit and a storage array. The storage array may include several analog or digital storage elements that can each store at least one output value from a photodetector of the lidar receiver. The control circuit may include a timing control circuit, a detection circuit, a switch control circuit, and a sample table circuit, for example.

The control circuit may be configured to control writing of the output values from the photodetector to the storage elements. During the TOF window, storage elements may be written and rewritten with output values from the photodiode. Upon detection of an event, which may be detection of a return pulse, for example, the storage elements that are currently storing data related to the event may be reserved for later processing. The event may be detected immediately, or may be detected after data has been stored for one or more TOF windows, for example. The storage elements that are not currently storing data related to the trigger event can continue to be written and rewritten during the TOF window. For analog storage elements, the reserved storage elements may be provided to an analog-to-digital converter for conversion along with a trigger timestamp and storage element identifiers, for example.

Figure 1:
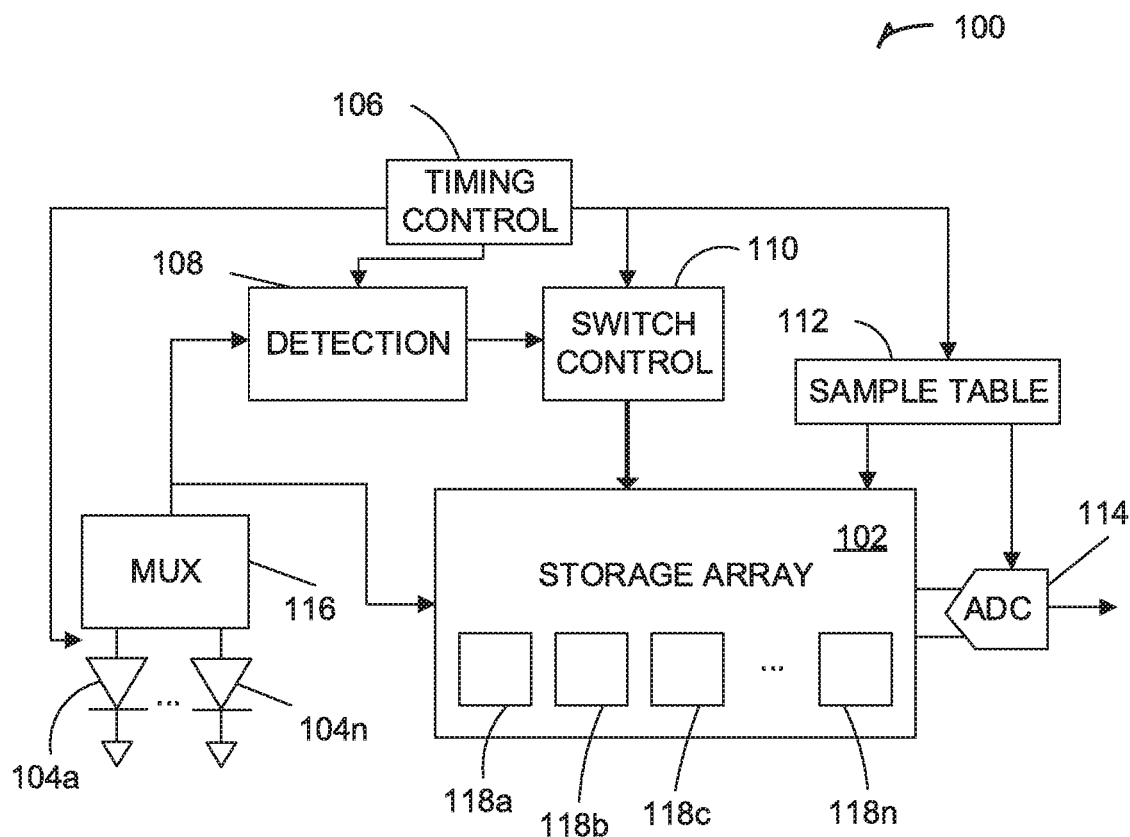
FIG. 1 is a block diagram illustrating an example analog storage system for a lidar receiver.

FIG. 1 is a block diagram illustrating an example storage system 100 for a lidar receiver. The storage system 100 includes a storage array 102, photodiodes 104a-104n, a timing control circuit 106, a detection circuit 108, a switch control circuit 110, a sample table circuit 112, an analog-to-digital converter (ADC) 114, and a multiplexer 116. The storage system 100 may be part of a lidar receiver, for example. The lidar receiver may also include, among other things, optics, solar filters, and a transimpedance amplifier (TIA) array. The storage array 102 may include one or more analog and/or digital storage elements.

The lidar system can include one or more attached light sources configured to emit an electromagnetic signal (e.g., visible light, short-wavelength infrared (SWIR), or other wavelength range) to illuminate a target or other object-of-interest. In another example, a light source separate from the lidar system can be used to illuminate the object-of-interest. A reflected or scattered electromagnetic signal can be received and focused by optics, for example, to the photodiodes 104a-104n. A TIA array or other current-to-voltage convertor, for example, may be used to convert the current received from the photodiodes into voltage for storage by the storage array 102. While illustrated as multiple photodiodes 104a-104n, in some examples, the system 100 may include a single photodiode.

Figure 3:
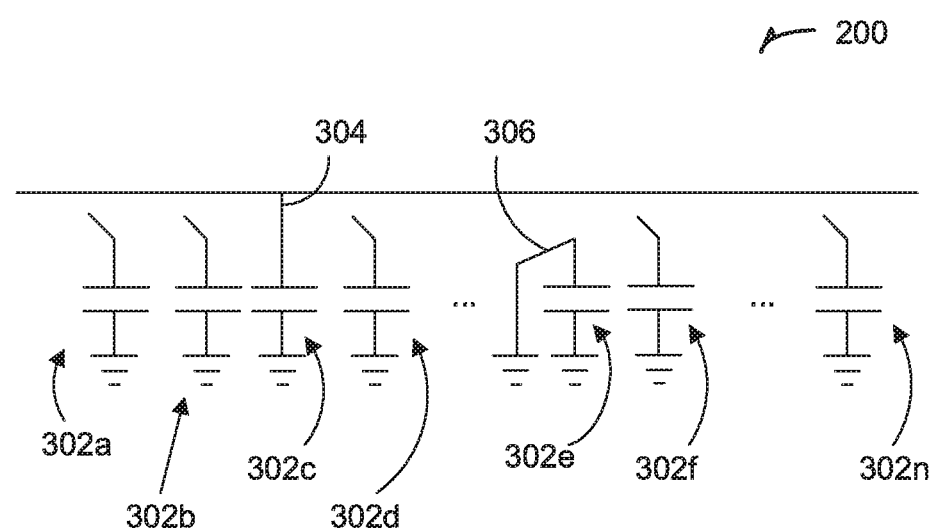
FIG. 3 is a circuit diagram illustrating an example array of analog storage elements.

The storage array 102 may include several storage elements 118a-118n, such as capacitors, for example, as illustrated in FIG. 3. During a TOF window of an emitted pulse of the lidar system, the photodiodes 104a-104n are configured to sense optical signals so as to detect a return pulse of the emitted pulse. This way, a controller of the lidar system or other system is able to determine a distance to an object-of-interest, for example, using the TOF of the return pulse.

The photodiodes 104a-104n may be configured to generate a current indicative of received optical signals, for example. The storage array 102 may be configured to store these values during one or more TOF windows. In an example, the current generated by the photodiodes 104a-104n may be converted to a voltage by a transimpedance amplifier or other current-to-voltage converter circuit.

The timing control circuit 106, the detection circuit 108, the switch control circuit 110, and the sample table circuit 112 can form a control circuit used to control storage of the output values of the photodiodes 104a-104n to the storage array 102. The control circuit can be implemented using analog circuitry, digital circuitry, or a combination thereof. Analog values of interest stored by the storage array 102, for example, can be provided to the ADC 114 by the control circuit for conversion along with a timestamp, storage element ID(s), and/or other data of interest with respect to a detected trigger event. The output of the ADC 114 may be provided to a digital storage system, for example, for storage of the respective data.

The timing control circuit 106, which may be a real-time controller, for example, may generate several timing signals for control of storage of signals and conversion of signals. In an example, the timing control circuit 106 may generate timing signals to control the switch control circuit 110 to control storage frequency of the values sensed by the photodiodes 104a-104n. The timing control circuit 106 can also stop storage of values following completion of a TOF window of an emitted pulse, for example, or following detection of a pulse by the detection circuit 108, for example. The timing control circuit 106 can also generate timestamps indicative of a trigger event based on a trigger generated by the detection circuit 108, for example.

The detection circuit 108 may include a time-to-digital converter (TDC), a computational fluid dynamics (CFD) circuit, an analog power detect circuit, or any other analog or digital circuit configured to detect a trigger event such as a detected return pulse based on the output values of the photodiodes 104a-104n. In an example, the detection circuit 108 may be a comparator circuit configured to generate a trigger if the present signal from one or more of the photodiodes 104a-104n is greater than a threshold value indicative of a return pulse. In some examples, the detection circuit 108 may use recent values stored by the analog storage elements 118a-118f to detect a trigger event. For example, the detection circuit may compare a single value on one of the storage elements 118a-118f, or an average value on multiple ones of the storage elements 118a-118f to a threshold value to detect a return pulse. In another example, the detection circuit 108 may detect an event by analyzing data stored for the entirety of one or more TOF windows using a dynamic threshold, for example.

The switch control circuit 110 may be configured to control one or more respective switches or other devices for each of the storage elements 118a-118f. For example, each storage element 118a-118f may include a switch to charge or otherwise write data to the element to store an output value from one of the photodiodes 104a-104n, and a switch to discharge or otherwise erase the element so as to reuse the element in a subsequent storage. The switch control circuit 100 may include any analog circuitry, digital circuitry, or combination thereof. For example, the switches can be field-effect transistors, bipolar junction transactions, or any other type of switch.

The sample table circuit 112 may be configured to store information regarding the storage array 102 and/or events detected by the detection circuit 108. The sample table circuit 112 can include any type of volatile or non-volatile storage elements, and any other analog or digital circuitry. In some examples, the sample table circuit 112 may be configured to store a timestamp for a trigger event, identifiers of the storage elements 118a-118f that store data regarding the trigger event, and/or identifiers of the storage elements 118a-118f that do not store data regarding the trigger event and thus can be overwritten.

In some examples, the output values of the photodiodes 104a-104n can be stored sequentially using the timing control from the timing control circuit 106. The frequency at which the output values are stored to the storage elements 118a-118n can be set based on a desired distance precision. For example, storing a value every 2 ns can provide a more precise distance determination than storing a value every 10 ns.

In one example, the storage elements 118a-118n may include 20 capacitive storage elements divided into two groups of 10 elements. A first group of 10 may be used to record output values continuously (for example, written and rewritten) until a trigger is generated by the detection circuit 108. After receiving the trigger signal (detection of an event), the first group may be reserved to retain the values, forming a detection window. To capture the full detection window, the first group may continue to record values for a specified amount of time (such as to obtain 5 further values, for example) so as to center the pulse within the detection window, for example. The second group of 10 storage elements can then be used to continuously store data for the remainder of one or more TOF windows. The values of the first group of 10 elements that store the values for the detection window can be provided to the ADC 114 for conversion while other storage elements continue storing values.

In some examples, the storage elements 118a-118n can be written to over multiple TOF windows. For example, the storage elements 118a-118n can be charged during a first TOF window, and then recharged (without discharging) during subsequent TOF windows. Because the detected pulse is expected to arrive at the same time for each TOF window, by charging over multiple TOF windows, larger values can be obtained for each storage element 118a-118n, allowing greater distinction between detected events and background noise.

In another example, the storage elements 118a-118n can be divided into multiple groups. The groups may be sized to store values for an expected detected return pulse duration. For example, if information relevant to a detected pulse is expected to be a 20 ns window, and elements are stored to once every 2 ns, the storage elements 118a-118n may be divided into groups of 10 or more elements. Values may be stored to storage elements 118a-118n sequentially and/or in a circular fashion across the several groups. Following detection of a return pulse, one or more groups can be reserved that store information relevant to the detected return pulse.

Once one or more groups of storage elements 118a-118n have been reserved, the system may continue storing values in the same manner. The reserved groups may be replaced by previously unused groups. For example, an array of storage elements 118a-118n may originally store values to N groups, while the array includes a total of N+2 or more groups. The 2 or more extra groups may be unused until a return pulse is detected. Once a group is reserved as storing data related to a return pulse, one of the unused groups can be substituted for the reserved group such that the system may continue storing values in the same manner.

Each group may also be used to store output values at a different rate. For example, for a first portion of the TOF window, output values may be stored to the storage elements 118a-118n at a rate of ins, for a second portion of the TOF window, output values may be stored at a rate of 5 ns, and for a third portion of the TOF window, output values may be stored at a rate of 10 ns. Within each of these groups, storage elements can be reused during the respective portion of the TOF window until an event is detected or the respective portion of the window is complete. This allows a more precise distance to be determined, for example, for objects that are closer to the lidar receiver. For analog storage elements, the reserved groups can be provided to the ADC 114 for conversion. By only providing the reserved groups to the ADC 114 for conversion, the amount of digital storage and the load on the ADC can be greatly reduced.

Figure 2:
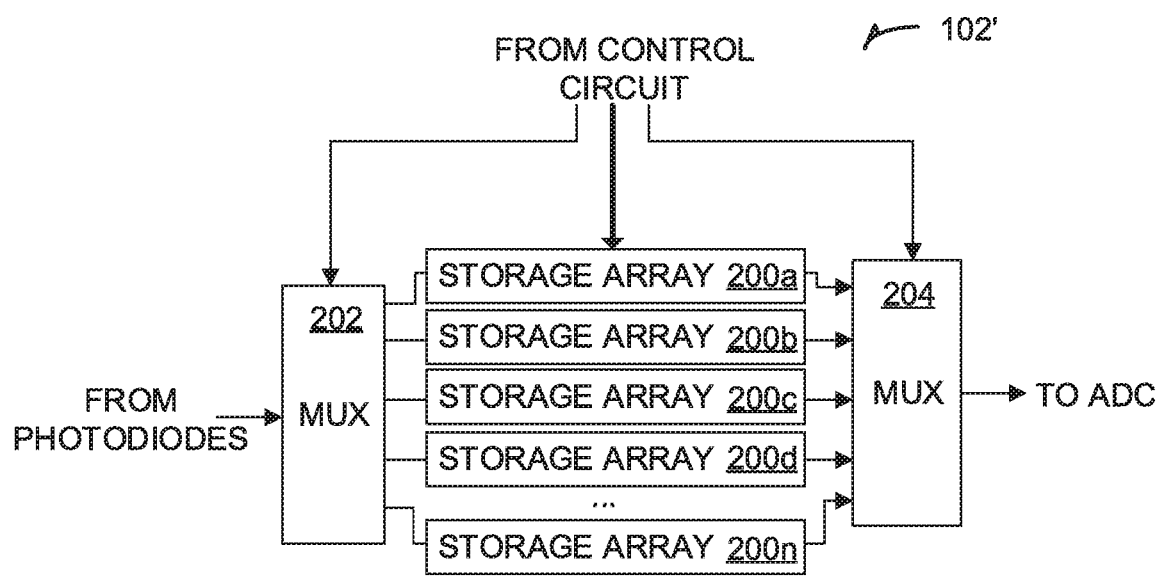
FIG. 2 is a block diagram illustrating an example of an analog storage array for an analog storage system for a lidar receiver.

FIG. 2 is a block diagram illustrating an example of a storage array 102' for use in the storage system 100. The storage array 102' includes storage element arrays 200a-200n and multiplexers 202 and 204. The storage element arrays 200a-200n can each include several storage elements, such as is illustrated in FIG. 3, for example. The control circuitry of FIG. 1 can control the multiplexer 202 to select which of the storage element arrays 200a-200n is currently being written to and can control the multiplexer 204 to select which array 200a-200n is provided to the ADC in embodiments with analog storage elements.

The storage array 102' may be used in lidar receivers to receive and store data regarding multiple return pulses during a TOF window of an emitted pulse. For example, for an object-of-interest that is behind a window or other transparent object, multiple return pulses may be received by the lidar receiver. Thus, one of the storage arrays 200a-200n may be used to continuously store values until a trigger is detected. Then, a second one of the storage arrays 200a-200n may be used to continuously store values until a second trigger is detected, with the first array 200a-200n reserved for further processing. Following the second trigger, the second storage array 200a-200n can also be reserved for further processing and another of the remaining arrays 200a-200n can be used to continuously store values. This can be continued for the duration of the TOF window of an emitted pulse to obtain information regarding multiple return pulses.

The sample table circuit 112 can store information regarding a state of each of the storage arrays 200a-200n. For example, for each of the storage arrays 200a-200n, the sample table circuit 112 can store an indication of whether or not the respective storage element array 200a-200n includes stored data relevant to a trigger event, such as a return pulse. For example, the storage element array 200b may include stored data relevant to a detected return pulse, and the storage element arrays 200a and 200c-200n may not include stored data relevant to a detected return pulse. Thus, the control circuit can overwrite the data stored in the storage element arrays 200a and 200c-200n with new data from the photodiodes 104a-104n, and retain the data stored by the analog storage element array 200b for conversion by the ADC 114. In some examples, different arrays 200a-200n may be used to store output values for respective photodiodes 104a-104n.

FIG. 3 is a circuit diagram illustrating an example array 200 of analog storage elements 302a-302n. The example array 200 can be used to implement the storage array 102, and/or any of the storage arrays 200a-200n. As illustrated, storage element 302c is currently being charged (storing a value) through connection 304, storage element 302e is currently being discharged (zeroed out) through connection 306, and the other storage elements 302a-302n are retaining their current states.

In one example, values can be stored to the storage elements 302a-302n circularly such that after element 302a is written to, the control circuit circles back to storage element 302n to continue writing values (assuming the elements 302a-302n are written to in a counterclockwise direction). To prepare for the next pass of writes, the control circuit discharges the capacitors as is seen for storage element 302e. Thus, while the control circuit is writing values to the elements 302a-302n, the control circuit can also be discharging elements 302a-302n to prepare for the next pass of writes. The element 302a-302n currently being discharged can be a preset number of elements away from the element 302a-302n currently being written in order to ensure the integrity of the data written to the present element 302a-302n. Upon detection of an event, the control circuit can stop discharging the elements 302a-302n such that the values stored on one or more of the elements 302a-302n can be reserved for later conversion.

In another example, elements can be written to in a ping-gong fashion. For example, elements 302a and 302b may be written to continuously until an event is detected. For example, a value can be written to the element 302a while the element 302b is discharged. Then, a value can be written to element 302b while element 302a is discharged. This can continue until a trigger is detected.

In some examples, an initial trigger can be generated by the detection circuit 108 that indicates preliminary detection of a return pulse. For example, the initial trigger can be an output of one of the photodiodes 104a-104n that is greater than an intermediate threshold less than the threshold that confirms detection of a return pulse. Once the initial trigger is generated, the ping-pang storage to elements 302a and 302b may be terminated, the values stored by elements 302a and 302b can be retained, and the control circuit can continue storing values using elements 302c-302n for the remainder of a detection window (for example, 10 total values). During the detection window, the control circuit may also confirm detection of a return pulse by generating a second trigger based on the output values of the photodiodes 104a-104n exceeding a primary threshold greater than the intermediate threshold.

Figure 4:
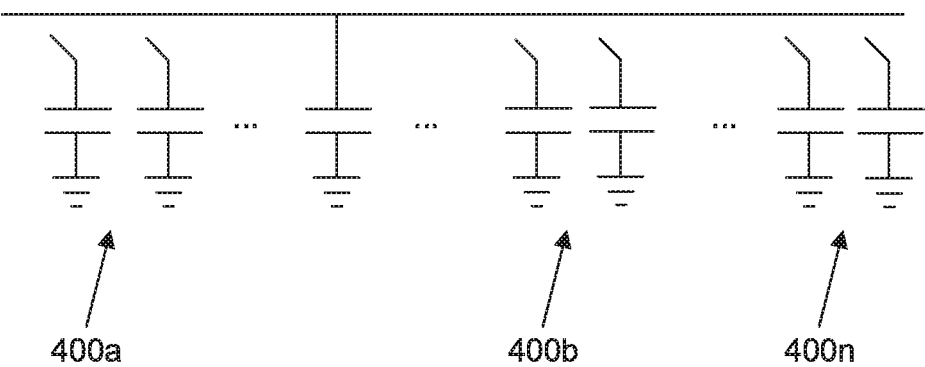
FIG. 4 is a circuit diagram illustrating groups of analog storage elements in an example array of analog storage elements.

FIG. 4 is a circuit diagram illustrating analog storage elements divided into groups 400a-400n. While illustrated as two elements per group, the groups 400a-400n may each include any number of groups. The array 200 may also be divided into any number of groups 400a-400n. The groups 400a-400n may be sized to store values for an expected detected return pulse duration. For example, if information relevant to a detected pulse is expected to be a 20 ns window, and elements are stored to once every 2 ns, the analog storage elements may be divided into groups 400a-400n of 10 or more elements each. Values may be stored to the groups 400a-400n sequentially and/or in a circular fashion. Following detection of a return pulse, one or more groups 400a-400n can be reserved that store information relevant to the detected return pulse.

Once one or more groups 400a-400n of analog storage elements have been reserved, the system may continue storing values in the same manner. The reserved groups may be replaced by previously unused groups. For example, an array of storage elements may originally store values to N groups 400a-400n, while the array includes a total of N+2 groups 400a-400n. The 2 extra groups may be unused until a return pulse is detected. Once a group is reserved as storing data related to a return pulse, one of the unused groups can be substituted for the reserved group such that the system may continue storing values in the same manner. The reserved groups may then be converted using the ADC 114, for example, for storage by a digital storage array. This reduces the amount of digital storage needed for lidar receivers, for example.

Figure 5:
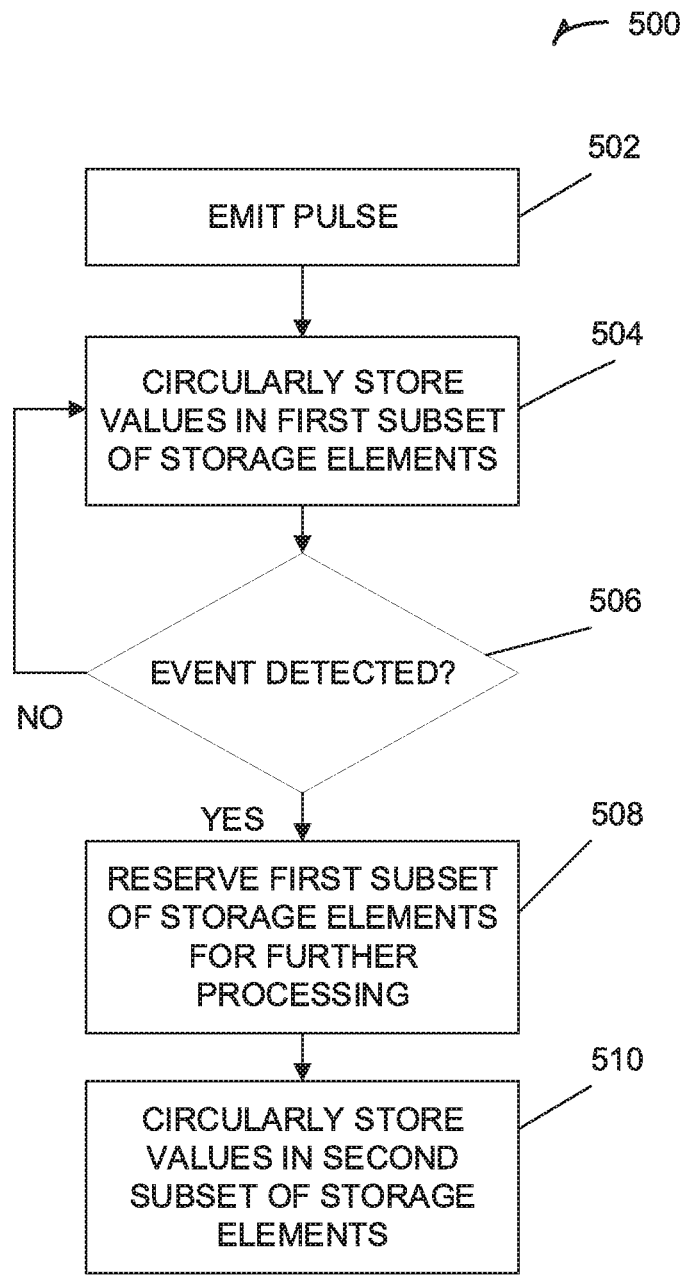
FIGS. 5-10 are flowcharts illustrating example methods of storing data to analog storage elements of an analog storage array for a lidar receiver.

FIGS. 5-10 are flowcharts illustrating example methods of storing data to storage elements of a storage array for a lidar receiver. FIG. 5 is a flowchart illustrating an example method 500 of controlling storage of values to storage elements for a storage system of a lidar receiver. At step 502, the lidar system emits a pulse and the TOF window begins. Once the pulse is emitted, data storage may begin to the storage array 102. In a pulse modulated system, a timing control circuit (such as timing control circuit 106) can start and stop storage operations based on emission of a pulse, for example. At step 504, data is stored to a subset of the storage elements 118a-118n, for example, in a circular fashion. In an example, 10 capacitors may be initially used to circularly store output values from the photodetectors.

While storing values, an analog or digital detection circuit can monitor for a return pulse, for example. At step 506, the detection circuit determines if an event, such as detection of a return pulse, has been detected. In one example, the detection circuit can check the values of a previous number of stored values (for example, 10) to determine if a pulse has been detected using an analog power detect or other circuit. In another example, current output values from the photodiodes can be compared to a threshold to detect a return pulse.

At step 508, if a pulse was detected, a sample table (such as is stored by sample table circuit 112) may be updated to include information regarding the first subset of the storage elements. One or more time stamps can also be added to the sample table indicative of a time at which the data was obtained and/or the event was detected. At step 510, output values of the photodiodes may be circularly stored to a second subset (for example, 10) of the storage elements. This can continue for the remainder of a TOF window of the emitted pulse, for example. If an event was not detected at step 506, the method 500 returns to step 504 to continue storing values to the first subset of storage elements.

Figure 6:
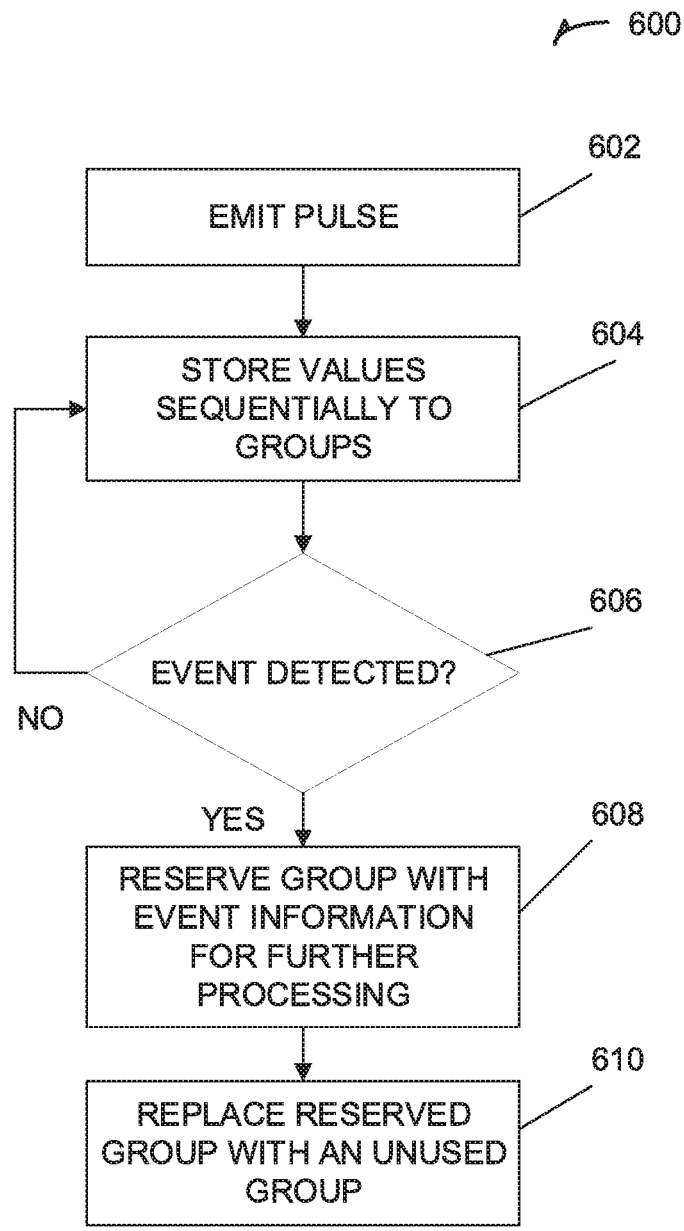

FIG. 6 is a flowchart illustrating another example method 600 of controlling storage of values to storage elements such as those divided into groups 400a-400n. At step 602, the lidar system emits a pulse and a TOF window begins for the emitted pulse. Once the pulse is emitted, data storage may begin to the storage array 102. In a pulse modulated system, a timing control circuit (such as timing control circuit 106) can start and stop storage operations based on emission of a pulse, for example. In an example, the storage elements may be divided into groups similar to groups 400a-400n illustrated in FIG. 4. At step 604, values are stored sequentially across the groups 400a-400n.

While storing values, an analog or digital detection circuit can monitor for a return pulse, for example. At step 606, the detection circuit determines if an event, such as detection of a return pulse, has been detected. In one example, the detection circuit can check the values of a previous number of stored values (for example, 10) to determine if a pulse has been detected using an analog power detect or other analog or digital circuit. In another example, current output values from the photodiodes can be compared to a threshold to detect a return pulse.

Figure 7:
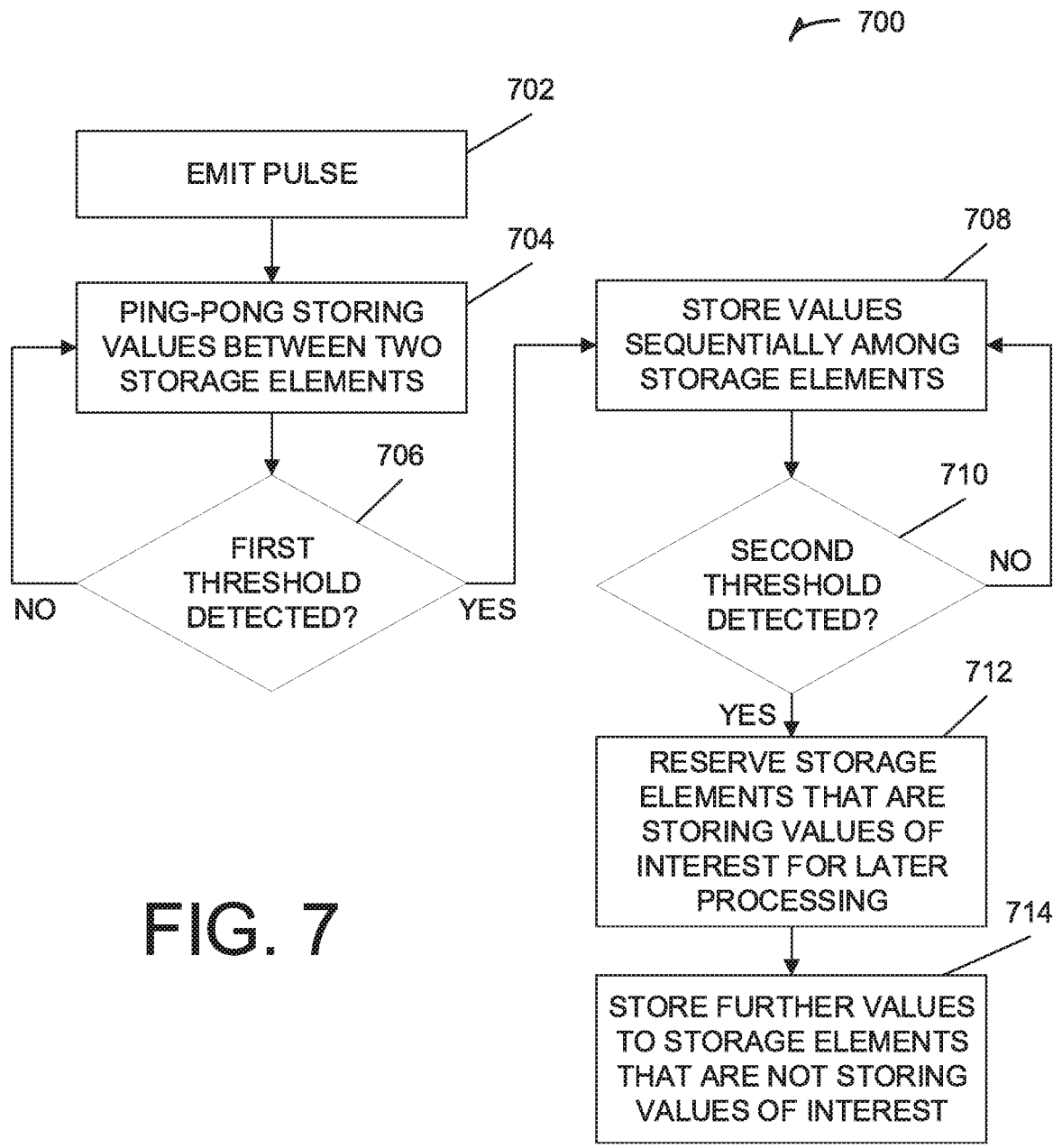

At step 608, if a pulse was detected, a sample table (such as is stored by sample table circuit 112) may be updated to include information regarding the group 400a-400n of the storage elements that includes information relevant to the event. One or more time stamps can also be added to the sample table indicative of a time at which the data was obtained and/or the event was detected. At step 610, the reserved group 400a-400n may be replaced by a currently unused group 400a-400n and output values of the photodiodes may continue to be stored. This can continue for the remainder of a TOF window of the emitted pulse, for example. If a trigger was not detected at step 606, the method 600 returns to step 604 to continue storing values to the first subset of analog storage elements FIG. 7 is a flowchart illustrating another example method 700 of controlling storage of values to storage elements for a storage system of a lidar receiver. At step 702, the lidar system emits a pulse and a TOF window begins for the emitted pulse. Once the pulse is emitted, data storage may begin to the storage array 102. In a pulse modulated system, a timing control circuit (such as timing control circuit 106) can start and stop storage operations based on emission of a pulse, for example. At step 704, data is stored between two or more elements, such as elements 302a and 302b of FIG. 3, in a ping-pong fashion. For example, a value can be written to element 302a while element 302b is discharged. Then, a value can be written to element 302b while element 302a is discharged. This can continue until an event is detected, for example.

While storing to two or more storage elements in a ping-pong fashion, a detection circuit can monitor for a first threshold value of the output of the photodiodes, for example. This threshold may be indicative of a potential received pulse. At step 706, if the first threshold is detected, the method 700 proceeds to step 708. If the first threshold is not detected, method 700 returns to step 704 and continues to store values to the one or more elements in a ping-pang fashion. At step 708, values are stored sequentially to several additional storage elements. For example, values may be stored to storage elements 302c-302n in a sequential manner. During the sequential storing of values, the detection circuit may monitor for a second threshold, which may be used to confirm detection of a return pulse for the emitted pulse. At step 710, if the second threshold is detected, the method 700 proceeds to step 712, and if the second threshold is not detected, the method 700 returns to step 708 to continue storing values sequentially. In some examples, if the second threshold is not detected following storage to a specified number of elements (for example, 10), the method 700 may return to step 704 and resume storage of values to two or more elements in a ping-pong fashion.

Following detection of the second threshold, at step 712, the elements storing values related to the detected pulse are reserved for further processing (for example, analog-to-digital conversion for embodiments with analog storage elements). In one example, a specified number of elements following detection of the second threshold may also be reserved in order to form a full detection window around the received pulse. At step 714, values continue to be stored in a ping-pong fashion or other fashion to unreserved storage elements for the remainder of the TOF window, for example.

Figure 8:
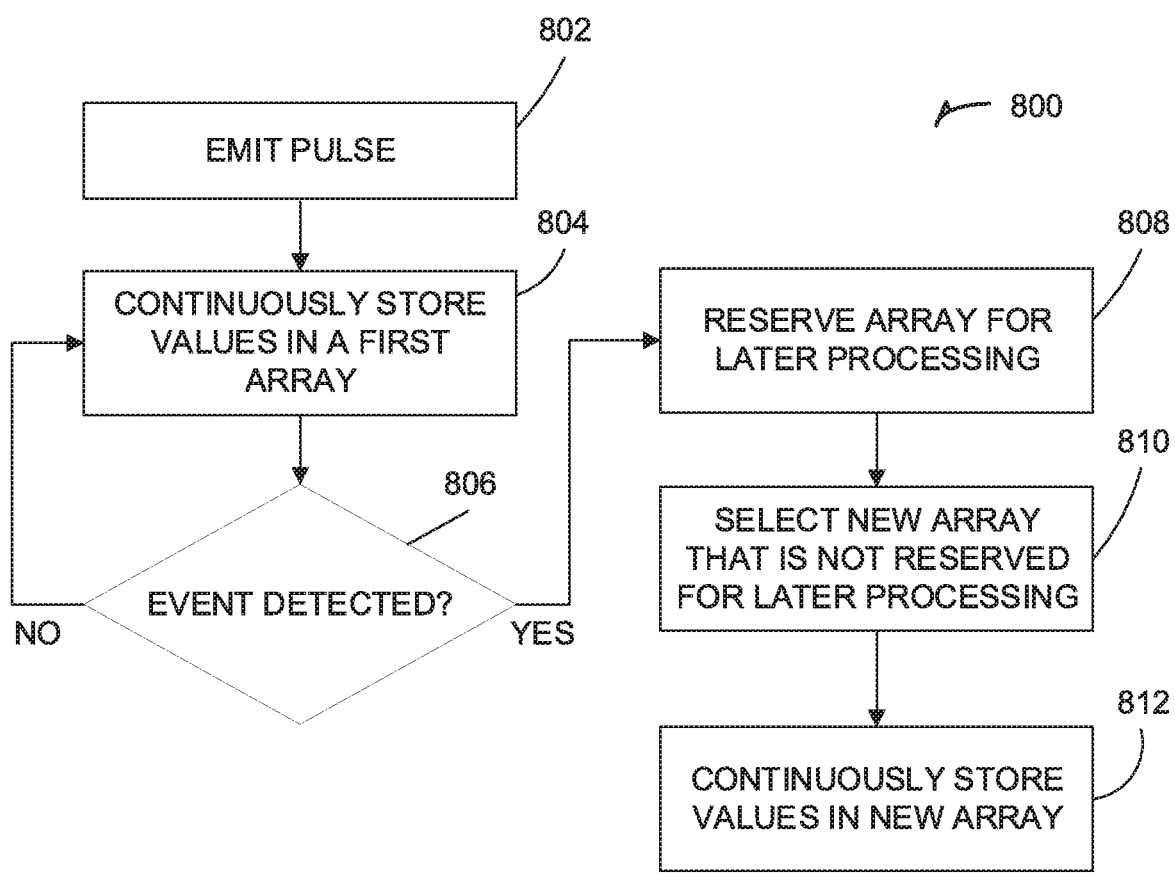

FIG. 8 is a flowchart illustrating an example method 800 of controlling storage of values to storage elements for a storage system of a lidar receiver using the storage array 102' of FIG. 2, for example. At step 802, the lidar system emits a pulse and a TOF window begins for the emitted pulse. Once the pulse is emitted, data storage may begin to one of the arrays 200a-200n of the storage array 102'. In a pulse modulated system, a timing control circuit (such as timing control circuit 106) can start and stop storage operations based on emission of a pulse, for example. At step 804, data is continuously stored to one of the arrays 200a-200n, such as the array 200a in a continuous fashion. For example, the elements of the array 200a can be stored to in a circular fashion.

While storing to elements of the array 200a, a detection circuit can monitor for an event, such as a detected return pulse of the emitted pulse. At step 806, if an event is detected, the method 800 proceeds to step 808 and reserves the array 200a for further processing. If an event is not detected, the method returns to step 804 and continues to store values to the first array 200a. At step 810, a new array is selected by the control circuit based on information stored in a sample table, for example. At step 812, values are stored in the new array (for example, one of arrays 200b-200n) continuously until another trigger is detected or the TOF window for the pulse has completed.

Figure 9:
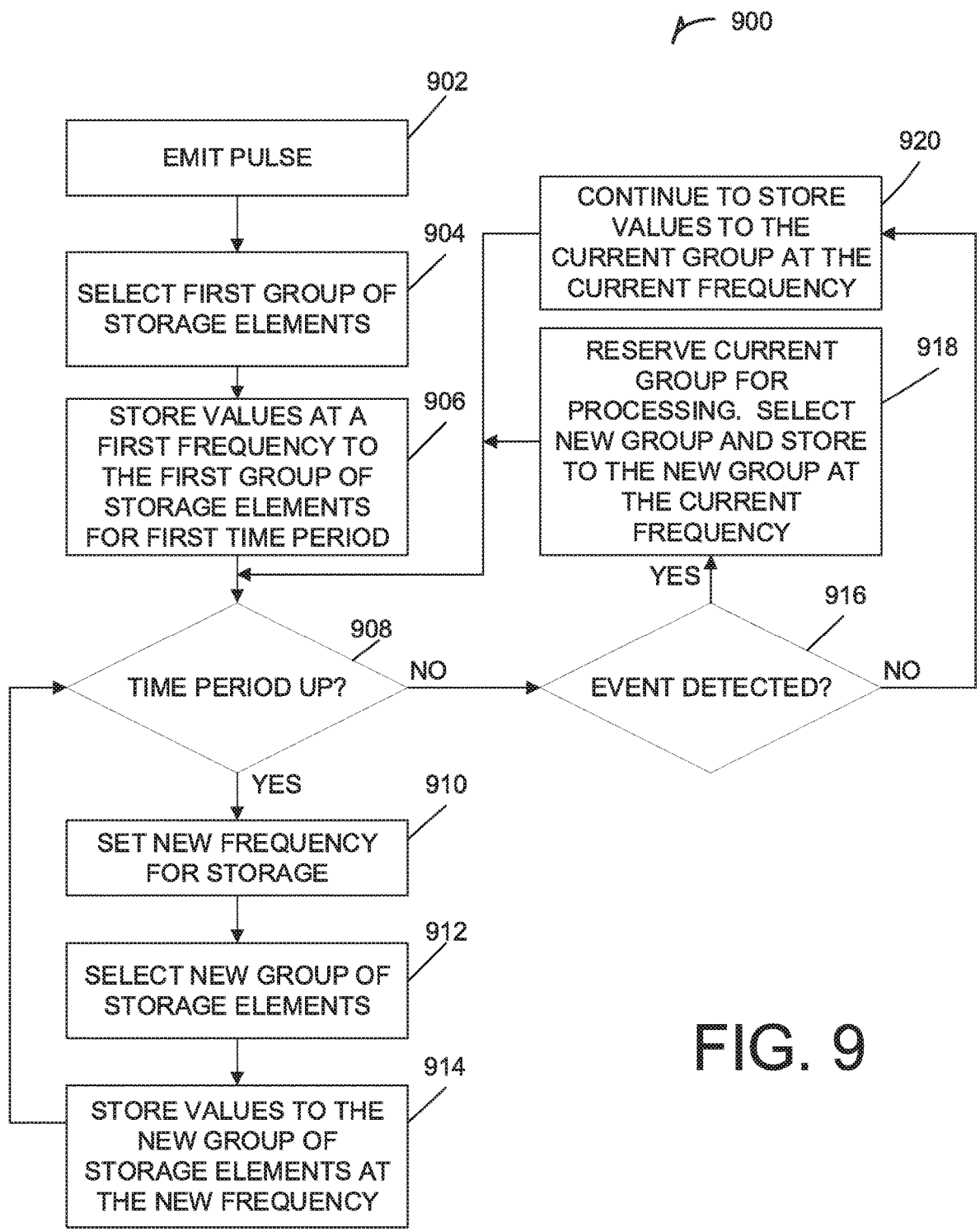

FIG. 9 is a flowchart illustrating an example method 900 of controlling storage of values to storage elements for a storage system of a lidar array to store values at multiple frequencies. This can be advantageous to obtain a greater distance precision for objects that are closer to the lidar receiver, for example. At step 902, the lidar system emits a pulse and a TOF window begins for the emitted pulse. At step 904, a control circuit is configured to select a group of storage elements 118a-118n for storage of output values of the respective photodiodes. At step 906, values are stored to the first group of storage elements 118a-118n at a first frequency, which may be a high frequency to provide a high distance precision for objects that are close to the lidar system. At step 908, it is determined if a present time period has completed since the start of the TOF window. This can be an amount of time for which the lidar system desires to store values at the first frequency (for example, at a high distance precision). If the time period has not expired, the method proceeds to step 916 and checks for detection of an event. If the time period has expired, the method 900 proceeds to step 910 and sets a new frequency for storage.

The second frequency can less than the first frequency, as it may be acceptable to have a smaller distance precision for objects that are further away from the lidar system. At step 912, a new group of storage elements 118a-118f are selected for storage of output values of the photodiodes at the second frequency. In some examples, the second group can have a same number of storage elements 118a-118f as the first group, can have fewer storage elements 118a-118f, or can have more storage elements 118a-118f as the first group. At step 914, values are stored to the second group of storage elements 118a-118f at the new frequency. Following step 914, the method 900 returns to step 908.

If an event is detected at step 916, such as a return pulse, the method 900 proceeds to step 918 and reserves the present group of storage elements 118a-118f for further processing. If no trigger was detected at step 916, the method 918 proceeds to step 920 and continues to store values to the present group of storage elements 118a-118f at the present frequency. The method 900 may continue for the entirety of a TOF window of the emitted pulse, for example.

The control circuitry used to implement the methods illustrated in FIGS. 5-10 may be implemented using any combination of analog and/or digital circuitry, such as the circuitry illustrated in FIG. 1. While reducing the overall amount of storage devices needed by the system, the methods illustrated in FIG. 5-10 also reduce the load on the ADC 114 for analog storage systems, for example, due to elimination of the data not related to detected events during one or more pulse time-of-flight windows.

Figure 10:
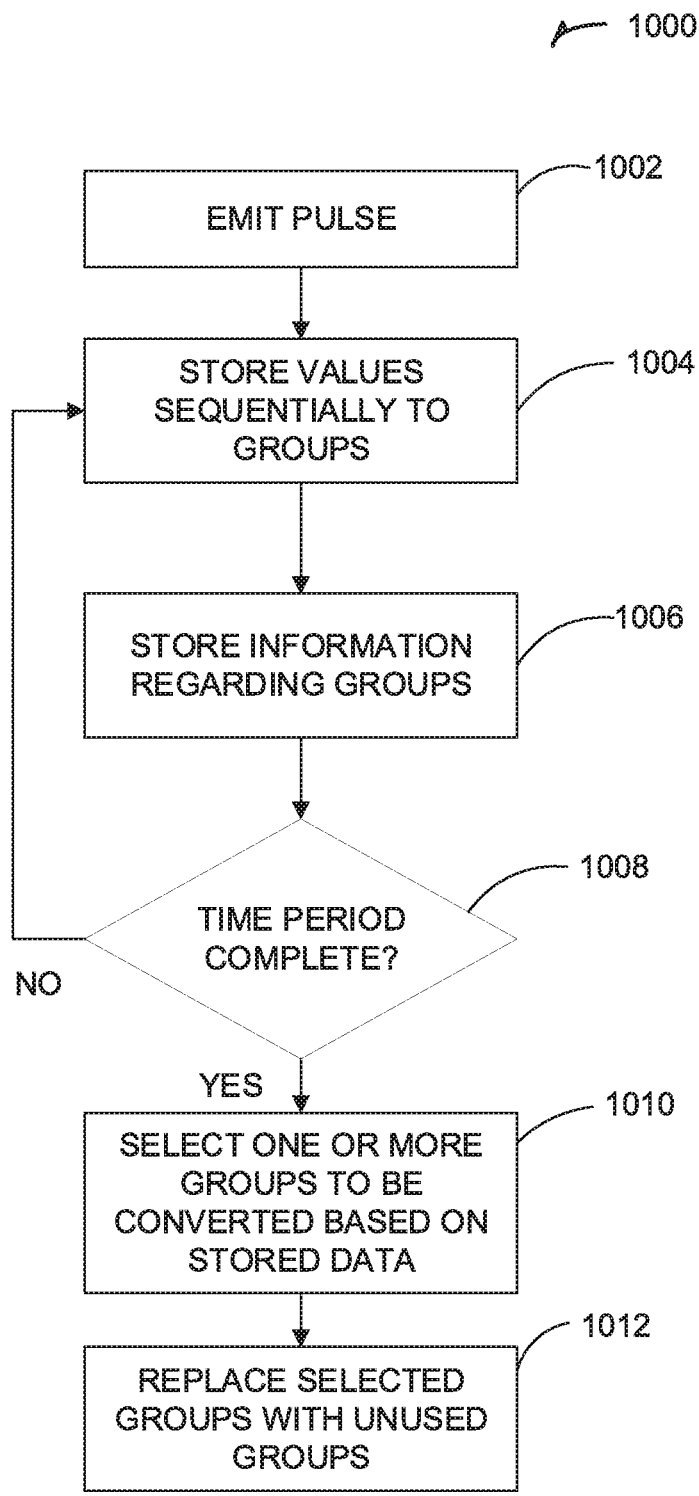

FIG. 10 is a flowchart illustrating another example method 1000 of controlling storage of values to storage elements such as those divided into groups. In the example described in FIG. 10, event detection may be performed after a TOF window or other time period has completed on data stored during the entirety of the time period. At step 1002, the lidar system emits a pulse and a TOF window or other capture time period begins for the emitted pulse. Once the pulse is emitted, data storage may begin to the storage array 102. In a pulse modulated system, a timing control circuit (such as timing control circuit 106) can start and stop storage operations based on emission of a pulse, for example. The storage elements may be divided into groups and at step 604, values are stored sequentially across the groups.

While storing values, an analog and/or digital control circuit can monitor and store data regarding each group, for example. At step 1006, the control circuit logs information regarding each group. In one example, the control circuit may log which groups have stored data during the TOF window and at what time the respective groups stored the data. At step 1008, it is determined if the TOF window or other time period has completed. If so, method 1000 proceeds to step 1010, and if not, method 1000 returns to step 1004. At step 1010, using the data stored during the entirety of the time period, it is determined if an event occurred during the TOF window or other capture time period, and which groups contain information regarding the respective event (i.e., a detection window is determined). If an event occurred, the relevant groups (detection window) may be selected for conversion using the information stored during step 1006 if the storage array includes analog storage elements. In examples in which the storage array includes digital storage elements, the relevant groups (detection window) may be provided for further processing. At step 1010, the selected groups may be replaced by a currently unused group and output values of the photodiodes may continue to be stored for a subsequent TOF window while the selected groups are processed.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system for storing sensed values in an optical receiver corresponding to time-of-flight windows for receiving optical signals elicited by emitted optical pulses, the system comprising:
   at least one photodetector configured to generate output signals indicative of received optical signals;
   a storage array comprising a plurality of storage elements and connected to receive and store the output signals from the at least one photodetector corresponding to at least a portion of a time-of-flight receive window; and
   a control circuit configured to control storage of output signal values by the storage array, wherein the control circuit is configured to:
   write and overwrite the output signal values to a first subset of storage elements during a time-of-flight receive window that is timed relative to an emitted optical signal pulse, wherein the storage elements include multiple storage elements of the plurality of storage elements of the storage array;
   detect a returned optical signal pulse of the emitted optical signal pulse during the time-of-flight receive window;
   retain data on the first subset of storage elements in response to the detecting of the optical signal return pulse during the time-of-flight receive window, and write and overwrite subsequent output signal values from at least one photodetector to a second subset of storage elements of the plurality of storage elements of the storage array during the same time-of-flight receive window in response to the detecting of the returned optical signal pulse.

2. The system of claim 1, wherein the control circuit comprises a detection circuit configured to detect the optical signal pulse event immediately as the returned optical signal pulse of the emitted optical signal pulse.

3. The system of claim 1, wherein the control circuit is configured to detect the optical signal pulse event after the time-of-flight receive window has completed based on values stored by the plurality of storage elements and determine a detection window that comprises the first subset of storage elements.

4. The system of claim 1, wherein the plurality of storage elements are analog storage elements that each comprise at least one capacitor, and wherein the system further comprises an analog-to-digital converter circuit configured to convert the written output signal values of the first subset of storage elements when the data is retained on the first subset of storage elements.

5. The system of claim 1, wherein the plurality of storage elements are arranged in a plurality of arrays, and wherein a first one of the plurality of arrays comprises the first subset of the plurality of storage elements, and wherein the control circuit is further configured to write and overwrite the output signal values to a second one of the plurality of arrays following detection of the returned optical signal pulse.

6. The system of claim 1, wherein the plurality of storage elements are arranged in a plurality of groups, and wherein a first one of the plurality of groups comprises the first subset of storage elements, and wherein:
the control circuit is configured to write and overwrite the output signal values to each of the plurality of groups prior to the detection of the optical signal pulse event; and
the control circuit is further configured to replace the first one of the plurality of groups with a replacement group following detection of the returned optical signal pulse.

7. The system of claim 1, wherein the control circuit comprises a timing circuit configured to control a frequency at which the output signal values are written to the plurality of storage elements.

8. The system of claim 7, wherein the control circuit is further configured to:
write and overwrite the output signal values to the first subset of storage elements at a first frequency,
following a first time period of the time-of-flight window, write and overwrite the output signal values to the second subset of storage elements at a second frequency different than the first frequency.

9. The system of claim 1, wherein the control circuit is configured using analog or digital circuitry and further comprises a sample table circuit configured to store timestamp information regarding the event and identifiers for the first subset of storage elements.

10. A method for storing sensed values in an optical receiver corresponding to time-of-flight windows for receiving optical signals elicited by emitted optical pulses, the method comprising:
generating, by at least one photodetector, output signals indicative of received optical signals;
writing and overwriting the output signals to a first subset of storage elements that includes multiple storage elements of a plurality of storage elements of a storage array during at least a portion of a time-of-flight receive window that is timed relative to an emitted optical signal pulse;
detecting a returned optical signal pulse of the emitted optical signal pulse during the time-of-flight receive window; and
retaining data on respective storage elements that comprise at least the first subset of storage elements in response to the detecting of the optical signal return pulse during the time-of-flight receive window, and change to writing and overwriting subsequent output signal values of the at least one photodetector to a second subset of storage elements of the plurality of storage elements of the storage array during the same time-of-flight receive window in response to the detecting of the returned optical signal pulse.

11. The method of claim 10, further comprising:
converting the written output signals of the first subset of storage elements from analog signals to digital signals in response to the detecting of the returned optical signal pulse.

12. The method of claim 10, wherein the plurality of storage elements are arranged in a plurality of arrays, and wherein a first one of the plurality of arrays comprises the first subset of storage elements, and wherein the method further comprises writing and overwriting the output signals to a second one of the plurality of arrays as the second subset of storage elements in response to the detecting of the returned optical signal pulse.

13. The method of claim 10, wherein the plurality of storage elements are arranged in a plurality of groups, and wherein a first one of the plurality of groups comprises the first subset of storage elements, and wherein writing and overwriting the output signals to the first subset of storage elements during at least a portion of a time-of-flight receive window comprises writing and overwriting the output signals to each of the plurality of groups, and wherein the method further comprises replacing the first one of the plurality of groups with a replacement group during the time-of-flight receive window in response to the detecting of the returned optical signal pulse.

14. The method of claim 10, wherein the plurality of storage elements each comprise at least one capacitor.

15. The method of claim 10, wherein writing and overwriting the output signals to the first subset of storage elements during at least a portion of a time-of-flight receive window comprises writing and overwriting the output signal values to the first subset of storage elements at a first frequency, and wherein the method further comprises writing and overwriting the output signal values to the second subset of storage elements at a second frequency different than the first frequency following a first time period.

16. The method of claim 10, further comprising storing timestamp information, from a timing circuit, regarding the event and identifiers for the first subset of storage elements.

17. A system comprising:
means for generating output signals indicative of received optical signals;
storage means for receiving and storing the output signals from the means for generating the output signals corresponding to at least a portion of a time-of-flight receive window that is timed relative to an emitted optical signal pulse; and
control means for controlling storage of output signal values by the storage means, wherein the control means is configured to:
write and overwrite the output signal values to a first subset of storage elements during the time-of-flight receive window, wherein the storage elements include multiple storage elements of the storage means,
detect a returned optical signal pulse of the emitted optical signal pulse during the time-of-flight receive window, and
retain data on respective devices that comprise at least the first subset storage elements in response to the detecting of the optical signal return pulse during the time-of-flight receive window, and write and overwrite subsequently generated output signal values to a second subset of storage elements of the storage means during the same time-of-flight receive window in response to the detecting of the returned optical signal pulse.

18. The system of claim 17, wherein the control means comprises detection means configured to detect the returned optical signal pulse of emitted optical signal pulse, and wherein the system further comprises converter means configured to convert the written output signal values of the first subset of the storage elements to digital signals in response to the detecting the returned optical signal pulse.

19. The system of claim 17, wherein the storage means comprises a plurality of capacitors.

20. The system of claim 17, wherein the control means comprises a timing circuit configured to control a frequency at which the output signal values are written to the storage means.

* * * * *